Jan. 9, 1940.  L. CODDINGTON  2,186,477
OILING SYSTEM
Filed March 25, 1938
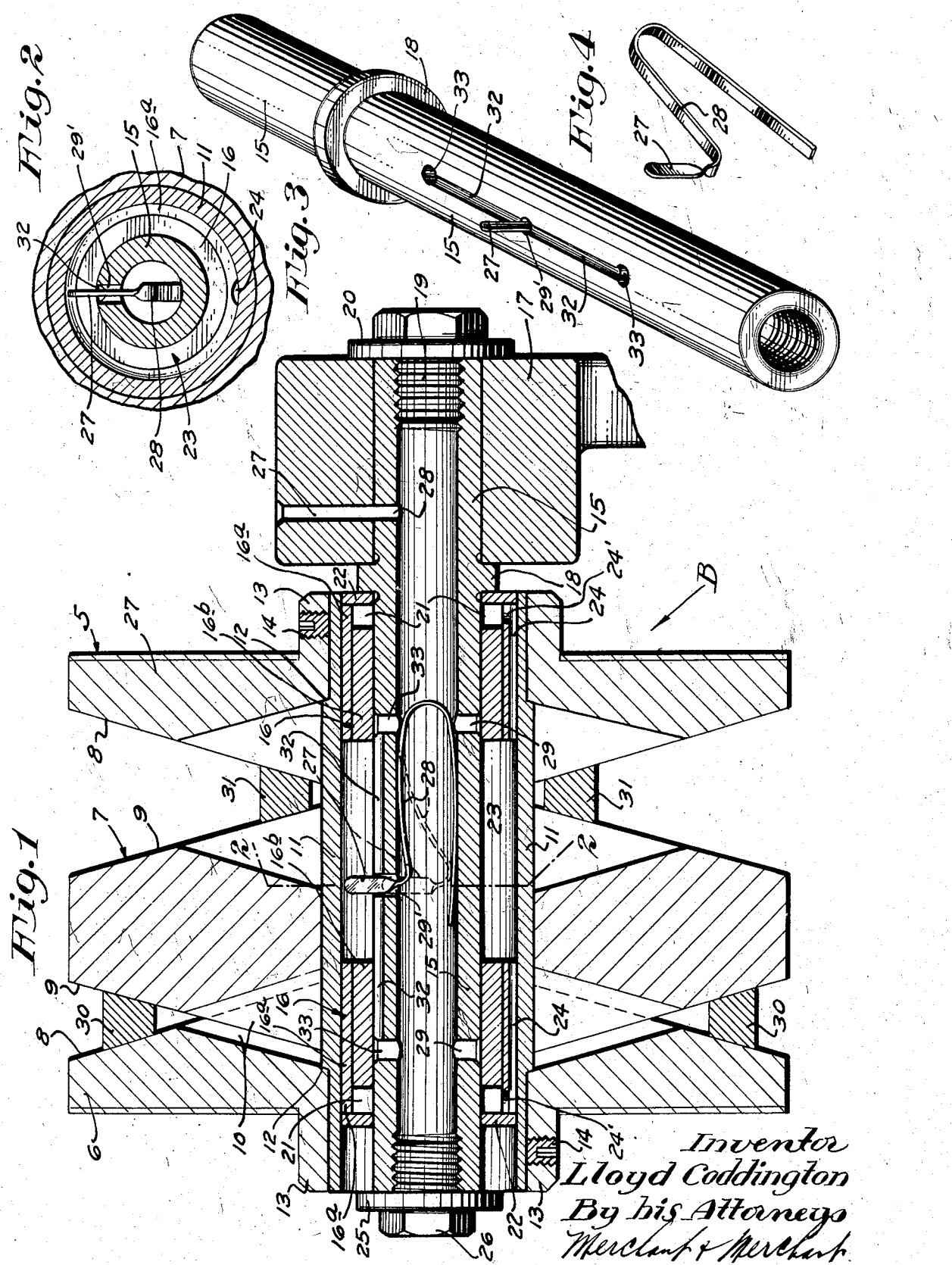
Inventor
Lloyd Coddington
By his Attorneys
Merchant & Merchant Patented Jan. 9, 1940

2,186,477

UNITED STATES PATENT OFFICE 2,186,477

OILING SYSTEM

Lloyd Coddington, Minneapolis, Minn.

Application March 25, 1938, Serial No. 198,065

3 Claims. (Cl. 308—117)

My present invention relates to an improved oiling system for rotary devices, and particularly those rotary devices which run at high speed and are journaled on and power driven with respect to their axles.

While the invention is adapted for use in connection with a wide variety of mechanisms, it is particularly applicable to idling transmission devices, such as idle pulley, that are usually journaled on fixed axles. In fact, the instant invention was primarily worked out to satisfy the lubricating requirements of the variable speed pulley transmission mechanism of my co-pending application S. N. 143,039, which was filed May 17, 1937, under the title of "Variable speed transmission mechanism", and has now become Patent 2,151,189, March 21, 1939.

In variable speed power transmission devices of the kind described in my above identified application and which includes a serially connected pair of variable diameter pulley units, the pulley units are often run at very high speed and this is particularly true of the second pulley unit in the line of drive. High speed mechanisms of this general character referred to, due to the exceedingly high speeds at which they are often operated, bring about a requirement for a highly efficient lubricating system for the bearings thereof, since there is a tendency in these devices to throw lubricant out from between the relatively rotating bearing surfaces thereof by centrifugal force and which, in the conventional structure, often results in starvation of the bearings of lubricant under prolonged extremely high speed operation.

An important object of the present invention is the provision of a lubricating system for devices of the type that are power driven on their axles that will maintain a constant circulation of fluid lubrication between the relatively rotating surface of the bearings thereof.

The above and other important objects and advantages of the invention will be made apparent from the following specification, claims and drawing.

In the accompanying drawing like characters indicate like parts throughout the several views.

Referring to the drawing:

Fig. 1 is an axial sectional view of a multiple flange variable diameter pulley unit of the general character disclosed in my above identified co-pending application but incorporating the oiling system of the instant invention;

Fig. 2 is a fragmentary transverse sectional view taken on the line 2—2 of Fig. 1;

Fig. 3 is a perspective view of the axle upon which the variable flange pulley unit is journaled; and Fig. 4 is a detailed perspective view of a spring member formed at one end to provide an oil intercepting scoop.

In the drawing, the multiple flange pulley unit, which as previously stated, is very similar to the pulley units A and B of my co-pending application, is indicated as an entirety by capital B and includes three pulley flanges, to wit: an axially spaced pair of relatively fixed inner and outer flanges 5 and 6, respectively, and a co-operating intermediate cone-faced pulley flange 7 mounted co-axially of and for axial sliding movements between the flanges 5 and 6. The pulley flanges 5 and 6 have radially outwardly diverging conical inner surfaces 8 and co-operating intermediate pulley flange 7 has radially outwardly converging conical surfaces 9. To permit maximum desired axial adjustment of the intermediate pulley flange 7 in the direction of either the inner pulley flange 5 or the outer pulley flange 6, the conical surfaces 8 and 9 are radially slotted adjacent the axis to form intermeshing teeth 10, as in my identified co-pending application and other prior art devices.

The inner and outer relatively fixed pulley flanges 5 and 6 are pressed fit on opposite end portions of a mounting tubular sleeve 11 with their base portions adjacent the sleeve 11 spaced apart a distance approximately equal to the maximum width of the intermediate movable pulley flange 7. In fact, the space of the inner and outer flange is preferably slightly less than the maximum width of the intermediate pulley flange so that the radial teeth 10 of the intermediate pulley flange will always be in interlapping engagement with the teeth 10 of one of the flanges 5 or 6. Preferably and as illustrated, the opposite end portion of the tubular mounting sleeve 11 are diametrically reduced to afford shoulders 12 against which the flanges 5 and 6 are pressed and which determine the spacing of the flanges 5 and 6. The flanges 5 and 6 may be assumed to be pressed on to the end portions of the sleeve 11 and as illustrated, the flanges 5 and 6 are provided with hubs 13 that are locked to the sleeve 11 by suitable set screws or the like 14. Insofar as this invention is concerned, the pulley flanges 5, 6 and 7 may be made of various different kinds of material, but in practice it has been found most practical to make these flanges of molded substance such as "Bakelite."

The tubular mounting sleeve 11 is journaled on a stub axle 15 through the medium of suitable axially spaced bearings, indicated as an entirety by 16. The stub axle is anchored in a suitable supporting structure 17 which may be the supporting rock arm of my co-pending application. In accordance with the instant illustration, the tubular stub axle 15 is provided near but spaced from its inner end with an annular flange 18 which is drawn into tight engagement with the supporting structure 17 through the medium of a stub bolt 19 and washer 20, the stub bolt 19 being internally screw threaded into the tubular axle 15.

The bearings 16 are in the nature of metallic bushings press fitted in and carried by the tubular mounting sleeve 11 and work over the stub axle with normal working clearance. These bearing bushings, as illustrated, are each made up of a hard metal outer sleeve 16a and a softer metal inner sleeve 16b, the former of which may be assumed to be steel and the latter of which may be assumed to be brass or bronze bearing material. The stub axle may be assumed to be of steel and, of course, the outer surface thereof forms the stationary of the relatively rotary bearing surfaces. The bearing sleeves 16b are axially shorter than the sleeve 16a to afford annular oil chambers 21 surrounding the stub axle. These outer annular chambers 21 are closed at their ends by means of lubricant sealing rings 22 that are press fitted into the bore of the tubular mounting sleeve 11 and work loosely over the stub axle. These sealing rings or washers 22 are preferably of relatively soft bearing material. The outer annular oil chambers 21 are connected to an intermediate annular lubricant chamber 23 surrounding the stub axle intermediate the bearings 16 by notches 24' and connected axially extended oil channels 24 formed in the peripheral portions of the outer bearing sleeves 16a. Preferably, the entire pulley unit assembly, inclusive of its bearings, is permitted to flow axially upon the stub axle 15 for the purpose of permitting the structure to automatically maintain proper belt alignment, and in accordance with the instant illustration, such axially floating movement of the pulley unit is permitted within the limits afforded between the flange 18 on one side and a flange 25 on the other, the flange 25 being formed by a washer that is locked in place against the outer end of the stub shaft by means of a stud bolt 26. The stud bolt 26 is internally screw threaded into the bore of the axle 15 and closes the outer end thereof.

Fluid lubricant such as ordinary engine oil is fed into the bore of the tubular axle 15 through aligned radial oil holes 27 and 28 in the mounting structure 17 and stub axle respectively, and this lubricant flows to the space between the relatively rotatable surfaces of the bearings through radial oil passages 29 in the lower or bottom portions of the stub axle. It will, of course, be understood that the inner bearing bushings 16b form only the rotary parts of the bearings and that the cooperating non-rotary parts of the bearings are actually afforded by the outer surface of the axle shaft itself.

A belt 30 is shown as being applied in the variable diameter V-groove formed between the outer conical surfaces 8 and 9, and a belt 31 is shown as being applied in the variable diameter V-groove formed between the inner conical surfaces 8 and 9. One of these belts may be assumed to be the driven belt and the other to be the driving belt. Of course, it will be understood that in variable speed power transmission devices of this character, speed changes are affected by simultaneously shifting the belts 30 and 31 in reverse directions with respect to the axis of the pulley unit, which action causes the intermediate pulley flange to shift and reversely vary the effective diameters of the driving and driven pulley grooves.

Under rotation of the pulley unit, fluid lubricant will flow from the interior of the tubular axle through the oil passages 29 to the space between the relatively rotated bearing surfaces from which the fluid lubricant will be discharged at opposite ends of the bearings under centrifugal action to the chambers 21 and 23 on opposite ends of the bearings. The oil thus discharged from opposite ends of the bearings will be thrown radially against the rotating outer walls of the chambers 21 and 23 and will rotate therewith in annular layers.

As previously indicated, the problem involved in satisfactory lubricating devices of this charter, is the resupplying of the bearing surfaces with lubricant which has thus been discharged therefrom under centrifugal action, and for this purpose I provide an oil intercepting scoop 27 that projects radially from the relatively fixed stub shaft 15 intermediate the bearings 16 and terminates in very close relation to the outer rotary wall of the chamber 23. Preferably and as illustrated, this oil intercepting scoop 27 is formed by an outturned end of a more or less U-shaped spring 28 applied within the bore of the tubular stub axle 15. This sear spring 28 is under tension to expand against the walls of the bore of the stub axle, and the scoop forming end 27 thereof works through a drilled hole 29' in the upper portion of the tubular axle. The scoop forming end 27 of the spring 28 is preferably twisted at a right angle to the main body of the spring so that it presents the wide surface in the plane of movement of the rotary body. Under operating conditions, the fluid lubricant is thrown centrifugally outwardly from the ends of the bearings 16 to the rotary outer walls of the connected chambers 21 and 23, and oil rotating with the rotary outer wall of the chamber 23 will be intercepted by the projecting free end of the scoop 27 and will run down said scoop, under the action of gravity, to the upper outside surface of the axle 15, from which point part thereof will flow through the axle opening 29' and find its way back to the bearing surfaces through the openings 29, and part thereof will be returned to the bearings by way of oil conducting channels 32 cut in the upper outside surface of the tubular axle 15. Any surplus oil thus returned to between the bearing surfaces will be returned by gravity to the interior of the tubular axle 15 through the radial oil return openings 33.

With the arrangement described, the body of oil initially applied within the tubular axle through the stationary oil holes 27 and 28, and which need be of any small volume, will be continuously circulated through the space between the relatively rotating surface of the bearings; the oil first flowing under the action of gravity into the space between the bearing surfaces, then being thrown radially outwardly from the ends of the bearing surfaces, and then being picked off of the rotating outer wall of the chamber 23 by the scoop 27 and permitted to flow back to the space between the bearing surface in the manner last above described. Of course, the oil thrown into the chambers 21 will flow through the channels 24 to the chamber 23.

The spring 28, which is formed to afford the scoop 27, is normally maintained by its own spring pressure in the position shown by full lines in Figs. 1, 2 and 3, but, to permit axial assembly of the pulley units inclusive of the bearing 16 on to the axle 15 the spring 28 will yield to permit retraction of the scoop 27 below the outer periphery of the axle, as shown by dotted lines in Fig. 1. The small body of oil maintained within the device will be sealed in by the sealing rings 22, since even in static condition of the device, the fluid level need not be up to the axle.

I claim:

1. In combination, a fixed tubular axle, a power driven transmission device concentrically journaled on said axle through the medium of axially spaced bearing bushings that are fixedly carried by the power transmission device and work with lubricant clearance over the tubular axle, means for closing the end portions of the axle bore, radial oil passages from the interior of the tubular axle exposed to said bearing bushings, the hub portions of said transmission device being formed to afford an annular chamber surrounding said axle intermediate said bearings, an oil intercepting scoop carried by the axle within said annular chamber and terminating in close proximity to the rotary outer wall of said chamber, and fluid ducts leading from said scoop to the spaces between said shaft and bearing bushings, and in further combination with a radial opening through the tubular axle intermediate said bearings, and in which said scoop is afforded by an outturned end of a U-shaped spring disposed within said tubular shaft and having its scoop-forming outturned end projecting outwardly through said last named radial opening and terminating in close proximity to the rotary outer wall of the chamber surrounding said shaft intermediate the bearings.

2. In combination, a relatively fixed axle, a rotary power transmission device having an axial tubular bore of larger diameter than the axle and being journaled on the axle through the medium of axially spaced bearing bushings fixedly carried by said rotary power transmission device within the tubular bore thereof, lubricant seals within the said bore axially outward of said bearings, the hub portion of said rotary power transmission device being formed to afford annular chambers between said shaft and bore axially between said bearings and lubricant seals, fluid ducts connecting the lower portion of the annular chambers intermediate said bearings, a lubricant intercepting scoop carried by and projecting radially from the intermediate portion of said axle and terminating in close relation to the outer rotary wall of the intermediate annular chamber, said oil intercepting scoop being located near the top of the axle, and lubricant ducts for directing oil intercepted by said scoop to the intermediate portions of said bearings, said oil intercepting scoop being in the nature of a tongue anchored within the axle and spring pressed outwardly thereof but retractible thereinto.

3. In combination, an axle, a power driven rotatable device journaled on said axle through the medium of at least one bearing having relatively rotatable surfaces, said rotatable device being formed to afford an annular chamber surrounding the shaft adjacent one end of the bearing into which the bearing will discharge fluid lubricant from between the relatively rotatable bearing surfaces thereof, and means for picking rotating fluid lubricant off the outer rotating wall of said chamber and delivering the same back to the space between the relatively rotatable bearing surfaces, whereby to automatically maintain a constant circulation of fluid lubricant through said bearing surfaces, said last named means being in the nature of an oil intercepting scoop mounted within the axle for projecting movements radially through the same into close proximity to the rotary wall of said chamber, and means yieldingly pressing said oil intercepting scoop to its outer position but permitting retraction thereof into the axle.

LLOYD CODDINGTON.